Patented July 13, 1937

2,086,542

UNITED STATES PATENT OFFICE 2,086,542

CATALYST FOR OXIDATION REACTIONS AND METHODS OF PREPARING THE SAME

William A. Douglass, Penns Grove, N. J., assignor to E. I. du Pont de Nemours & Company, Wilmington, Del., a corporation of Delaware No Drawing. Application April 8, 1932, Serial No. 604,118

17 Claims. (Cl. 23—234)

This invention relates to improvements in catalysts, particularly to catalysts for oxidation reactions, and more specifically to the partial oxidation of naphthalene, in the presence of an oxygen containing gas, to phthalic anhydride by a vapor phase method.

Consideration of the items of the cost of manufacture of phthalic anhydride shows the necessity for high production per unit volume of catalyst. The partial oxidation of naphthalene to phthalic anhydride is a highly exothermic reaction and the problem of dissipating heat becomes particularly difficult as the space-time production is increased. By space-time production is meant the quantity of product obtained per unit volume of catalyst per unit of time.

One type of equipment, which has been found to be particularly useful for the high space production of phthalic anhydride, is fully described in copending application, Serial No. 606,596 to Arthur D. Chambers filed April 21, 1932. In this apparatus, the catalyst is packed in a plurality of tubes approximately ¾ inch in diameter. The naphthalene-air mixture is led into a header from which it should be distributed equally to each of the catalyst tubes, if uniform conditions are to prevail throughout the apparatus. In order to obtain uniform conditions in the various tubes, the catalyst therein must be so packed and in such physical condition that there will be but slight differences in the capacity of the catalyst, the resistance to flow of the naphthalene-air mixture through the tubes, and in the conversion of the naphthalene to phthalic anhydride. Experience has shown that, at a relatively low rate of production with a correspondingly low space velocity, minor differences in the packing and action of the catalyst are relatively unimportant. However, as the space velocity is increased in order to obtain much higher rates of production, differences in the packing and physical character of the catalyst in the tubes, causes such variations in the resistance to flow and the conversion of the naphthalene that the efficiency of the process is materially lowered. The use of an orifice plate on each catalyst tube to equalize distribution has been suggested but this gives a very inflexible arrangement much less satisfactory than a single throttle valve on the outlet pipe from the apparatus which permits of variation of pressure within any range limited by the apparatus. Regardless of the method employed, the use of pressure, relatively great with respect to the back pressure developed by the resistance of the catalyst packing, tends to equalize the distribution of the vapor stream. Although the use of pressure minimizes the difficulties of uneven packing and variations in the physical character of the catalyst, much better results are obtainable when there is a minimum variation between the various catalyst tubes.

The use of pressure, which is necessary to minimize variations and distribution, introduces another complication. Catalysts of high vanadium pentoxide concentration, 50% or more, usually become thermally unstable at high pressures, due to the higher temperature resulting from the shortening of the reaction zone, lower actual space velocity, and longer contact time. Catalysts of lower vanadium pentoxide concentration are usually somewhat deficient in mechanical stability. Accordingly, the physical character of the catalyst becomes increasingly important as the time space production is increased.

A catalyst, to be satisfactory for use in such process and in apparatus such as has been mentioned, should have the following characteristics:

(1) High capacity; by which is meant the ability to continuously oxidize to the desired products, a large amount of hydrocarbon per unit volume of catalyst and per unit of time without decrease in rate over extended periods of time without necessity for reactivation or replacement.

(2) Mechanical stability; by which is meant sufficient rigidity of form to resist crumbling or breaking into smaller particles during the normal handling during preparation and charging of the converter, and to resist packing during use. In addition, the catalytically active material should be so thoroughly distributed or bound that there is no tendency for dusting either in handling or in actual use in the converter.

(3) Thermal stability; by which is meant resistance to change in physical form, such as sintering, swelling or excessive contraction, under the temperature conditions of use.

The factors of greatest importance, in the economic manufacture of phthalic anhydride by the oxidation of naphthalene with the employment of pressure and the increase of the space-time production, are (1) high capacity or maximum production per unit volume of catalyst material and per unit of time over extended periods of time and (2) stability of the catalyst and maintenance of its high capacity without the necessity for interrupting production for reactivation or renewal of the catalyst mass.

A catalyst having the requirements above set forth of high capacity, mechanical stability and thermal stability, permits catalyst tubes, in an apparatus such as has been mentioned heretofore, to be packed more uniformly and will permit the naphthalene-air mixture to be more equally and uniformly distributed to the catalyst tubes with more uniform production of phthalic anhydride throughout the apparatus. Such catalysts also permit the employment of increased space-time production and pressure and at the same time permit more ready control of the process.

An object of the present invention is to provide a catalyst having none of the disadvantages of the catalysts of the prior art. Another object is to produce catalysts having improved capacity, mechanical stability and thermal stability. A further object is to provide a novel method of producing vanadium oxide catalysts. Still other and further objects are to produce a new composition of matter and to advance the art. Other objects will appear hereinafter.

These objects may be accomplished according to the following invention which comprises preparing a catalyst by impregnating a uniformly porous support having inherently good mechanical strength with liquid of high vanadium pentoxide equivalent and subsequent conversion of the vanadium in the liquid to the catalytically active form without loss of vanadium and with substantially complete removal, by volatilization, of the other constituents of the vanadium liquid employed.

This invention may be more readily understood by a consideration of the principles on which it is based. The voids of a uniformly porous support which form a definite proportion of the gross volume are to contain a catalytically active material uniformly coated on the surfaces of the pores without clogging the pores so as to prevent the passage of gases therethrough. A liquid of low viscosity and devoid of solid particles is the only type of substance which may successfully penetrate the pores of the support to uniformly fill the voids. Furthermore, in its final form, the catalytically active material should be as concentrated as possible and in a solid state.

Vanadium pentoxide is a solid at ordinary temperatures and is so slightly soluble that it cannot be employed as such to advantage. Accordingly, it is necessary to employ compounds of vanadium which are liquid at ordinary temperatures or which are readily soluble in water, or the like. Such compounds, however, are not efficient catalysts and, for most successful use, must be converted to the oxide. Furthermore, it is contemplated to have only the vanadium oxide in and on the support. Accordingly, the vanadium compound employed must be such that all the constituents thereof except the vanadium and its oxides may be readily removed by a simple subsequent treatment without loss of vanadium and its oxides or disturbance of the uniform distribution of the vanadium compound in and on the uniformly porous support. Some of the vanadium compounds which I have found to be particularly satisfactory are vanadium oxy trichloride, vanadium tetrachloride, concentrated aqueous solutions of divanadyl tetrachloride, vanadyl sulfate, and vanadium salts of organic acids such as citric, malic, maleic, tartaric, oxalic and the like.

The first step, in the preparation of the catalyst of my invention, comprises treatment of the porous support with a liquid, such as has been described above, under reduced pressure, with intermittent application of the vacuum to remove the air in the voids of the support and to permit the liquid to more uniformly penetrate the same.

After the support has become thoroughly impregnated with the liquid, it is subjected to a subsequent step or series of steps to convert the vanadium compound to vanadium pentoxide in situ with removal of all of the other constituents of the liquid without loss of vanadium or its oxides and without alteration of the distribution of the vanadium in and on the porous support. The details of these subsequent steps will vary, depending upon the characteristics of the particular vanadium compound or liquid employed.

When a vanadium halide is employed for impregnating the porous support, the support is subjected to heat in the presence of moist air or other oxygen containing gas. The heat is gradually increased over extended periods of time and is so regulated that the vanadium halide is hydrolyzed, dried and dehydrated and oxidized to vanadium pentoxide. Substantially all of the substituents of the liquid, except the vanadium and its oxides, will be volatilized and removed from the support without loss of any of the vanadium.

When liquids containing other compounds of vanadium are employed for impregnating the porous support, the support is subjected to heat in the presence of air or other oxygen containing gas to decompose the vanadium compound, oxidize the vanadium to the pentoxide and volatilize all of the other constituents of the liquid. Such process does not necessarily entail the hydrolysis of the compound or such extended and carefully controlled heating.

In order to more clearly point out my invention and to illustrate the preferred modes in which I contemplate carrying the same into effect, the following examples are given:

*Example 1.*—Eight hundred (800) parts of sized material comprising a form of fused alumina known as "Alundum" having a particle size such that the particles will pass through a four mesh sieve and be retained on a six mesh sieve, were treated, under reduced pressure, with an aqueous vanadium chloride solution containing a $V_2O_5$ equivalent to 110 grams of such concentration that the $V_2O_5$ equivalent amounted to 33.8–34.8% of the solution. The "Alundum" was of such porosity that the solution was practically completely absorbed with uniform penetration entirely throughout the "Alundum" particles. The slightly moist impregnated "Alundum" was then heated to about 100° C. with frequent stirring in a steam jacketed enameled evaporator until the surface of the particles was completely dry. The catalyst, at this stage, was very hydroscopic, rapidly absorbing moisture from the air to form a dilute solution of vanadium chloride on the surface. It was therefore, transferred, without cooling or prolonged exposure to the air, to a quartz tube in which it was heated. The rate of heating was so controlled that it required 10 hours to raise the temperature from 100–200° C., 7 hours to raise the temperature from 200–350° C., 5 hours to raise the temperature from 350–425° C., and the temperature of 425° C. was then maintained for one hour longer. Throughout the entire heating of the catalyst in the quartz tube approximately 45 cubic feet of preheated moist air per cubic foot of catalyst per minute were blown through the quartz tube.

This treatment hydrolyzed the vanadium chloride and converted the resulting hydroxide to $V_2O_5$ without loss of catalytically active material.

The resulting catalyst contained approximately 12% vanadium pentoxide, completely and uniformly distributed throughout the entire porous support and was completely free from thermal or mechanical instability. This catalyst is particularly useful for the oxidation of naphthalene to phthalic anhydride at high space production rates, under elevated pressures.

Example 2.—Sixty-three (63) parts of an inert porous silicate known to the trade as "Filtros", having a particle size of about six mesh, were treated under reduced pressure with an aqueous vanadium chloride solution containing a $V_2O_5$ equivalent of 7.78 parts and a concentration such that the $V_2O_5$ amounted to about 33.8% of the solution. The resulting product was treated in accordance with the process set forth in Example 1. The penetration of the aqueous solution in the support was very good. The resulting catalyst contained about 10.7% $V_2O_5$ and had the desired properties to a satisfactory degree. This catalyst was found to be very satisfactory in the conversion of naphthalene to produce phthalic anhydride of a high quality.

Example 3.—One hundred (100) parts of sized "Alundum", similar to that employed in Example 1, were treated with an aqueous vanadium chloride solution having a $V_2O_5$ equivalent of 8.7 parts and of such concentration that the $V_2O_5$ amounted to 15% of the solution. The process of Example 1 was followed. The resulting catalyst was found to be very satisfactory, having the required thermal and mechanical stability but had a somewhat lower capacity than that produced according to Example 1, because of the lower vanadium pentoxide concentration.

Example 4.—A solution of vanadyl sulfate was prepared by reducing a slurry of hydrated vanadium pentoxide with sulfur dioxide in the presence of sulfuric acid, and evaporation to a concentration of 0.1902 gm. $V_2O_5$ equivalent per gm. of solution. 50 parts of sized "Alundum" having a particle size such that the particles will pass through a four mesh sieve and be retained on a six mesh sieve were treated under reduced pressure with 18.2 parts of the vanadium sulfate solution. The solution was practically completely absorbed with uniform penetration throughout the "Alundum" particles. The impregnated catalyst particles were dried at 100° C. for 4 hours and then charged into a catalyst tube through which a current of preheated dried air was passed at the rate of 45 cu. ft. per minute per cu. ft. of catalyst. The temperature was gradually raised from 100°–450° C. during 5 hours and maintained at 450° for an additional 2 hours. This treatment caused the dissociation of the vanadyl sulfate, volatilization of the sulfuric anhydride and oxidation to vanadium pentoxide. The resulting catalyst contained approximately 6.5% $V_2O_5$ completely and uniformly distributed throughout the entire porous support, was completely free from thermal or mechanical instability, and was found to be particularly useful for the oxidation of naphthalene to phthalic anhydride at high space production rates under elevated pressures.

Example 5.—A solution of vanadyl citrate was prepared from 80.2 parts ammonium meta vanadate and 192.0 parts citric acid, and contained 0.196 gm. $V_2O_5$ equivalent per gram of solution. 50 parts sized "Alundum" (through 4 mesh retained on 8 mesh) were treated under reduced pressure with 20.2 parts of the vanadyl citrate solution which was practically completely absorbed with uniform penetration. After drying at 100° C. under reduced pressure, the catalyst was charged into a tube through which a current of preheated dried air was passed at the rate of 45 cu. ft. per minute per cu. ft. of catalyst. The temperature was gradually raised from 100°–450° during 5 hours and maintained at 450° for an additional 2 hours. This treatment oxidized the organic acid and resulted in a catalyst containing approximately 7.3% $V_2O_5$, which was found to be particularly useful for the oxidation of naphthalene to phthalic anhydride.

From a consideration of the results obtained according to the foregoing examples which represent the preferred form of my invention, I have found that the supports must be catalytically inert and also must have a porosity substantially equal to that of "Alundum" in order to obtain a catalyst having the required characteristics of high capacity and thermal and mechanical stability. These examples also illustrate that the vanadium pentoxide should be as concentrated as possible and must be uniformly distributed throughout the voids of the porous support in order to obtain a catalyst having the desired characteristics to the greatest degree.

While in the examples given, I have specifically mentioned the use of an aqueous solution of the vanadium compound, it is to be understood that other readily volatile solvents may be employed in the place of water and that, where the compound is a liquid of low viscosity, it may be employed without a solvent. Also in place of the vanadium chloride various other compounds, such as the halide compounds and salts of acids which may be volatilized without difficulty, may be employed. Salts such as those of the alkali metals could not be employed due to the fact that the alkali metals are not readily volatilized.

While I have disclosed specific methods of preparing the catalyst, employing certain compounds in specified amounts, and specific temperatures and periods of time, it is to be understood that all or any one of these factors may be varied without departing from the spirit of my invention. Accordingly my invention is to be limited solely by the appended claims construed as broadly as is permissible in view of the prior art.

I claim:

1. The process of preparing a catalyst for oxidation reactions which comprises impregnating throughout, under substantially reduced pressure, a catalytically inert material, of the group consisting of fused alumina and silica sand bound together by a fused silicate bond, with a liquid comprising a vanadium compound all of the constituents of which, other than the vanadium and its oxides can be readily volatilized, the vanadium compound having a $V_2O_5$ equivalent such that the $V_2O_5$ amounts to at least 15% of the liquid, heating the impregnated material in an evaporator until the surfaces of the material are dry, and then heating the dried material in the presence of oxygen, gradually raising the temperature to approximately 425° C. over an extended period of time at such a rate as to oxidize the vanadium and volatilize the other constituents of the liquid while preventing the volatilization of catalytically active material.

2. The process of preparing a catalyst for oxidation reactions which comprises impregnating throughout a uniformly porous catalytically inert material, of the group consisting of fused alumina and silica sand bound together by a fused silicate bond, with a liquid comprising vanadium chloride and having a $V_2O_5$ equivalent of at least 15% of the liquid, and then heating the impregnated material in the presence of oxygen and moisture, gradually raising the temperature over an extended period of time at such a rate as to hydrolyze and oxidize the vanadium and volatilize the other constituents of the liquid while preventing the volatilization of catalytically active material.

3. The process of preparing a catalyst for oxidation reactions which comprises uniformly impregnating throughout a uniformly porous catalytically inert material, of the group consisting of fused alumina and silica sand bound together by a fused silicate bond, with a liquid comprising vanadium chloride and having a $V_2O_5$ equivalent of at least 15% of the liquid and then heating the impregnated material in the presence of oxygen and moisture, gradually raising the temperature to approximately 425° C. over an extended period of time at such a rate as to hydrolyze and oxidize the vanadium and volatilize the other constituents of the liquid while preventing the volatilization of catalytically active material.

4. The process of preparing a catalyst for oxidation reactions which comprises impregnating throughout a uniformly porous catalytically inert material, of the group consisting of fused alumina and silica sand bound together by a fused silicate bond, with a liquid comprising vanadium chloride and having a $V_2O_5$ equivalent of at least 15% of the liquid, heating the impregnated material in an evaporator until the outer surfaces of the material are dry, and then heating the dried material in the presence of oxygen and moisture, gradually raising the temperature to 425° C. over an extended period of time at such a rate as to hydrolyze and oxidize the vanadium and volatilize the other constituents of the liquid while preventing the volatilization of catalytically active material.

5. The process of preparing a catalyst for oxidation reactions which comprises impregnating throughout, under reduced pressure, a uniformly porous catalytically inert fused alumina with a liquid comprising vanadium chloride and having a $V_2O_5$ equivalent of at least 15% of the liquid, and then heating the impregnated material in the presence of oxygen and moisture, gradually raising the temperature to approximately 425° C. over an extended period of time at such a rate as to hydrolyze and oxidize the vanadium and volatilize the other constituents of the liquid while preventing volatilization of catalytically active material.

6. The process of preparing a catalyst for oxidation reactions which comprises treating, under reduced pressure, a uniformly porous catalytically inert fused alumina with an aqueous vanadium chloride solution having a $V_2O_5$ equivalent concentration of about 34% until the inert material is completely and uniformly impregnated with the solution, heating the impregnated material in an evaporator at about 100° C. until the outer surfaces of the particles are completely dry, then, without cooling, heating the dried material to gradually raise the temperature to about 200° C. in the course of about 10 hours, to about 350° C. in the course of about 7 hours more, to about 425° C. in the course of about 5 hours more, maintaining the temperature of about 425° C. for about one hour more, and passing preheated moist air through the material during the entire period of heating the dried material.

7. The process of preparing a catalyst for oxidizing naphthalene to phthalic anhydride which comprises treating with intermittent application of reduced pressure, particles of a uniformly porous catalytically inert fused alumina of 4 to 6 mesh in size with an aqueous vanadium chloride solution having a $V_2O_5$ equivalent concentration of about 34% until the alumina is completely and uniformly impregnated with the solution, heating the impregnated alumina at about 100° C. until the surfaces of the particles are completely dry, then, without cooling, heating the particles to gradually raise the temperature to about 200° C. in the course of about 10 hours, to about 350° C. in the course of about 7 hours, to about 425° C. in the course of about 5 hours and maintaining the temperature of about 425° C. for about one hour, and passing preheated moist air through the catalyst at a rate of about 45 cubic feet per cubic foot of catalyst per minute during the entire period of heating of the dried particles.

8. The process of preparing a catalyst for oxidation reactions which comprises treating, under reduced pressure, particles of a uniformly porous catalytically inert fused alumina, the particles of alumina being of such size that they will pass through a 4 mesh and be retained on a 6 mesh sieve, with an aqueous vanadium chloride solution having a $V_2O_5$ equivalent concentration of about 34% until the alumina is completely and uniformly impregnated with the solution, heating the impregnated particles at about 100° C. until the outer surfaces of the particles are completely dry, then, without cooling, heating the dried particles to gradually raise the temperature to about 200° C. in the course of about 10 hours, to about 350° C. in the course of about 7 hours more, to about 425° C. in the course of about 5 hours more, maintaining the temperature of about 425° C. for about one hour more, and passing preheated moist air through the particles during the entire period of heating the dried particles.

9. A porous catalyst for the vapor phase partial oxidation of organic compounds comprising a porous "Alundum" carrier the pores of which are coated throughout with substantially 6.5% or more of a vanadium oxide which is an oxidation catalyst.

10. A uniformly porous catalyst for the vapor phase oxidation of organic compounds comprising particles of a uniformly porous "Alundum" of such size that they will pass through a 4 mesh and be retained on a 6 mesh sieve, the pores of such particles being uniformly coated throughout with about 6.5% or more of a vanadium oxide which is an oxidation catalyst.

11. A catalyst for oxidation reactions comprising a product obtained by the process of claim 6 and in which the catalyst mass contains about 6.5% or more of vanadium oxide.

12. A catalyst for oxidation reactions comprising a product obtained by the process of claim 7 and in which the catalyst mass contains about 6.5% or more of vanadium oxide.

13. A catalyst for oxidation reactions comprising a product obtained by the process of claim 8 and in which the catalyst mass contains about 6.5% or more of vanadium oxide.

14. A porous catalyst for the vapor phase partial oxidation of organic compounds comprising a porous carrier of catalytically inert fused alumina having substantially 6.5% or more of a vanadium oxide which is an oxidation catalyst distributed within and throughout the pores of the carrier.

15. A uniformly porous catalyst for the vapor phase oxidation of organic compounds comprising particles of a uniformly porous carrier of catalytically inert fused alumina having substantially 6.5% or more of a vanadium oxide which is an oxidation catalyst substantially uniformly distributed within and throughout the pores of the carrier.

16. The process of preparing a catalyst for oxidation reactions which comprises impregnating throughout, under substantially reduced pressure, a catalytically inert material, of the group consisting of fused alumina and silica sand bound together by a fused silicate bond with a liquid comprising vanadium sulfate and having a $V_2O_5$ equivalent of at least 15% of the liquid, heating the impregnated material in an evaporator until the surfaces of the material are dry, and then heating the dried material in the presence of oxygen, gradually raising the temperature to approximately 425° C. over an extended period of time at such a rate as to oxidize the vanadium and volatilize the other constituents of the liquid while preventing the volatilization of catalytically active material.

17. The process of preparing a catalyst for oxidation reactions which comprises impregnating throughout, under substantially reduced pressure, a catalytically inert material, of the group consisting of fused alumina and silica sand bound together by a fused silicate bond with a liquid comprising vanadyl citrate and having a $V_2O_5$ equivalent of at least 15% of the liquid, heating the impregnated material in an evaporator until the surfaces of the material are dry, and then heating the dried material in the presence of oxygen, gradually raising the temperature to approximately 425° C. over an extended period of time at such a rate as to oxidize the vanadium and volatilize the other constituents of the liquid while preventing the volatilization of catalytically active material.

WILLIAM A. DOUGLASS.